US008602841B2

(12) United States Patent
Ellis (10) Patent No.: US 8,602,841 B2
(45) Date of Patent: Dec. 10, 2013

(54) FORM TAP AND METHOD OF MAKING SUCH

(76) Inventor: Harry Leroy Ellis, Georgetown (CA)

( * ) Notice: Subject to any disclaimer, the term of this patent is extended or adjusted under 35 U.S.C. 154(b) by 806 days.

(21) Appl. No.: 12/491,768

(22) Filed: Jun. 25, 2009

(65) Prior Publication Data

US 2010/0329806 A1    Dec. 30, 2010

(51) Int. Cl.
*B24B 49/00* (2012.01)

(52) U.S. Cl.
USPC .................. 451/11; 451/48; 451/58; 451/65; 451/547; 451/245; 451/249; 451/254; 451/258

(58) Field of Classification Search
USPC ......... 451/10, 11, 48, 49, 54, 57, 58, 65, 179, 451/222, 242, 245, 246, 249, 253, 254, 258, 451/547

See application file for complete search history.

(56) References Cited

U.S. PATENT DOCUMENTS

| | | |
|---|---|---|
| 710,988 A | 10/1902 | Muir |
| 3,121,340 A | 2/1964 | Anthony |
| 3,237,485 A | 3/1966 | Van Vleet |
| 3,561,171 A | 2/1971 | Van Vleet et al. |
| 4,289,110 A * | 9/1981 | Junker .................. 125/11.03 |
| 4,393,624 A | 7/1983 | Kushigian |
| 4,408,418 A | 10/1983 | Corrette |
| 4,548,000 A * | 10/1985 | Junker ............................ 451/48 |
| 4,696,130 A * | 9/1987 | Belthle ............................ 51/293 |
| 5,210,980 A * | 5/1993 | Phillips .......................... 451/11 |
| 5,595,528 A * | 1/1997 | Becker ............................ 451/72 |
| 5,738,572 A * | 4/1998 | Giebmanns ................... 451/221 |
| 6,499,920 B2 | 12/2002 | Sawabe |

FOREIGN PATENT DOCUMENTS

JP    2010284796 A * 12/2010

OTHER PUBLICATIONS

Balax. Thredfloer Forming Taps. http://www.balax.com/forming.html, Sep. 16, 2009.
Sutton Tools. Technical Information—Taps: Tap Measurement Simplified. http://www.google.com/url?sa=t&source=web&ct=res&cd=1&url=http%3A%2F%2Fwww.pnaust.com.au%2FAssets%2F1401%2F1%2FIPD05MeasurementThread_tap.pdf&ei=tW-yStO-HY2aMYqyIOQL&usg=AFQjCNG-dJfyQYINbySkfd9N22utlBfgOw&sig2=IZxnYu7UG8EdUt2hIGzK5w. Sep. 17, 2009, pp. 163-170.

* cited by examiner

*Primary Examiner* — Eileen P. Morgan
(74) *Attorney, Agent, or Firm* — Bereskin & Parr LLP (57) ABSTRACT

A form tap includes a shank having a shank length and a thread portion that extends along at least a portion of the shank length. The thread portion includes a finishing portion and a chamfer portion. Each of the finishing portion and the chamfer portion include a plurality of threads and each thread has a crest and a root. The plurality of threads of both the finishing portion and the chamfer portion are spaced apart at a constant pitch, such that a crest-to-crest distance between adjacent threads remains constant along the entire thread portion.

16 Claims, 6 Drawing Sheets

FORM TAP AND METHOD OF MAKING SUCH

FIELD

The described embodiments relate to form taps and to methods for making form taps.

BACKGROUND

The process of forming threads on the inner surfaces of holes is generally known as tapping. The tools used to form the threads are generally referred to as taps. Taps are generally classified into two categories "cut taps" and "form taps" based on the method used to produce the threads in the finished part being tapped.

A form tap creates threads on the inner surface of a hole by shaping and forming the material of the hole into the desired configuration. This process is also referred to as flowing the metal, cold forming, cold working or thread rolling. The leading tip of a form tap is narrowed or angled (chamfered) below the size (diameter) of the hole to be tapped, to allow the tap to be properly aligned with a hole, and to begin the forming process gradually when the form tap is used. The threads on the angled portion of a form tap are not ground or sheared into partial/truncated threads. Instead, the threads in the angled or chamfered portion of a form tap are generally formed as full threads having a crest and root configuration that is similar to the rest of the threads on the form tap. Traditional methods of manufacturing form taps tend to produce an error in the spacing, or pitch, of the threads between the crests of the threads of the finishing portion of the form tap and the crests of the threads of the angled or chamfered portion of the tap. This thread shaping error is generally known as lead error.

When a form tap has a lead error it may have a shorter lifespan and require increased torque to operate. One known attempt to correct lead error is the use of advanced CNC thread forming machines that allow for precise, computer control of the thread grinding process. However, form taps produced using CNC machines still tend to have a lead error between the crests of the threads on the finished form tap.

SUMMARY

The following introduction is provided to introduce the reader to a more detailed discussion to follow. The introduction is not intended to limit or define the claims.

Examples disclosed herein provide a form tap having no lead error and a grinding tool for creating the form tap having no lead error. The form tap comprises a plurality of threads for creating formed threads inside a hole or article being tapped. Each thread on the form tap has a crest and a root. The threads on the form tap are separated into a finishing portion and chamfer portion. The form tap is described as having no lead error (or having a lead error correction) because the crest-to-crest spacing between threads on the form tap remains constant along both the finishing portion and the chamfer portion as well as across the transition between the finishing portion and the chamfer portion.

The form tap having no lead error is created using a unitary grinding tool that can be installed on a traditional grinding machine. The grinding tool comprises two spaced apart ribs that extend from its periphery surface. The ribs and the spacing between them are configured such that the threads on the chamfer portion and the finishing portion of the form tap can both be formed using the unitary grinding tool, and that the grinding tool can be used to shape both the chamfer portion and finishing portion threads on each continuous machine pass.

In a first aspect, some embodiments of the invention provide a form tap that includes a shank having a shank length and a thread portion that extends along at least a portion of the shank length. The thread portion includes a finishing portion and a chamfer portion. Each of the finishing portion and the chamfer portion include a plurality of threads and each thread has a crest and a root. The plurality of threads of both the finishing portion and the chamfer portion are spaced apart at a constant pitch, such that a crest-to-crest distance between adjacent threads remains constant along the entire thread portion.

According to another broad aspect, a grinding tool for forming threads on a form tap is provided which comprises a grinding wheel, first and second ribs and a trough therebetween. The grinding wheel has a peripheral surface and the first and second ribs project radially from the peripheral surface of the grinding wheel for grinding the threads. The first rib is sized and shaped to grind the roots of threads on a finishing portion of the form tap. The first rib comprises a first peak and defines a first outer diameter, a first minor diameter and a first rib width. The second rib is shaped to grind roots of threads on a chamfer portion of the form tap. The second rib comprises a second peak and defines a second outer diameter that is smaller than the first outer diameter, a second minor diameter and a second rib width that is smaller than the first rib width. The trough has a grinding surface for grinding crests of the threads on both the finishing and chamfer portions of the form tap. The first and second peaks are spaced apart by a peak spacing distance, the peak spacing distance being different than a pitch of the threads.

In some examples, the first rib further comprises a first rib leading face and a first rib trailing face; and the second rib further comprises a second rib leading face that is substantially parallel with the first rib leading face, and a second rib trailing face.

In some examples, the first rib further comprises a first peak radius and the second rib further comprises a second peak radius that is smaller than the first peak radius.

In some examples, the first and second ribs are formed on the grinding wheel.

In some examples, the first rib is formed on the grinding wheel and the second rib is formed on a second grinding wheel.

In some examples, the peak spacing distance is based on the pitch and a chamfer angle.

In some examples, the peak spacing distance is less than the pitch.

In some examples, the trough further comprises a grinding surface for forming crests on the threads.

In some examples, the rib spacing distance is between n and n+1 pitches, wherein n is integer greater than or equal to zero.

In some examples, the second peak forms a sharp edge.

According to another broad aspect, a method of forming the thread portion of a form tap using a unitary grinding tool is provided, the method comprises the step of providing a blank. The blank has a first longitudinal axis defining a first axis of rotation and an outer surface. The method also comprises the steps of rotating the blank about the first longitudinal axis and providing a grinding tool. The grinding tool defines a second axis of rotation and has a peripheral surface that comprises first and second ribs projecting radially therefrom. The method also comprises the steps of rotating the grinding tool about the second axis of rotation. The second axis of rotation being substantially parallel to and offset from the first axis of rotation. The method also comprises the steps of positioning the first and second axes of rotation at a first distance so that at least one of the first and second ribs interfere with the outer surface of a chamfer portion of the blank, imparting relative axial movement between the blank and the grinding tool at an axial feed rate and simultaneously increasing the distance between the first and second axes of rotation, thereby at least partially forming a plurality of threads on the chamfer portion. The threads have crests spaced at a constant crest-to-crest spacing. The method also comprises the step of maintaining the relative axial motion between the blank and the grinding tool at the axial feed rate while maintaining the second axis of rotation at a second distance from the first axis thereby at least partially forming a plurality of threads on a finishing portion of the form tap. The threads on the finishing portion are continuous with, and have a constant crest-to-crest spacing with the threads on the chamfer portion.

In some examples, the threads on the finishing portion and the threads on the chamfer portion are formed by a single pass of the grinding tool.

In some examples, the threads on the finishing portion and the threads on the chamfer portion are formed by the combination of at least two passes of the grinding tool.

In some examples, wherein the grinding tool partially forms the threads of both the chamfer portion and the finishing portion on each pass.

In some examples, the threads on the finishing portion are only partially formed by the second rib.

In some examples, the partially formed threads on the finishing portion are completed by the first rib.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
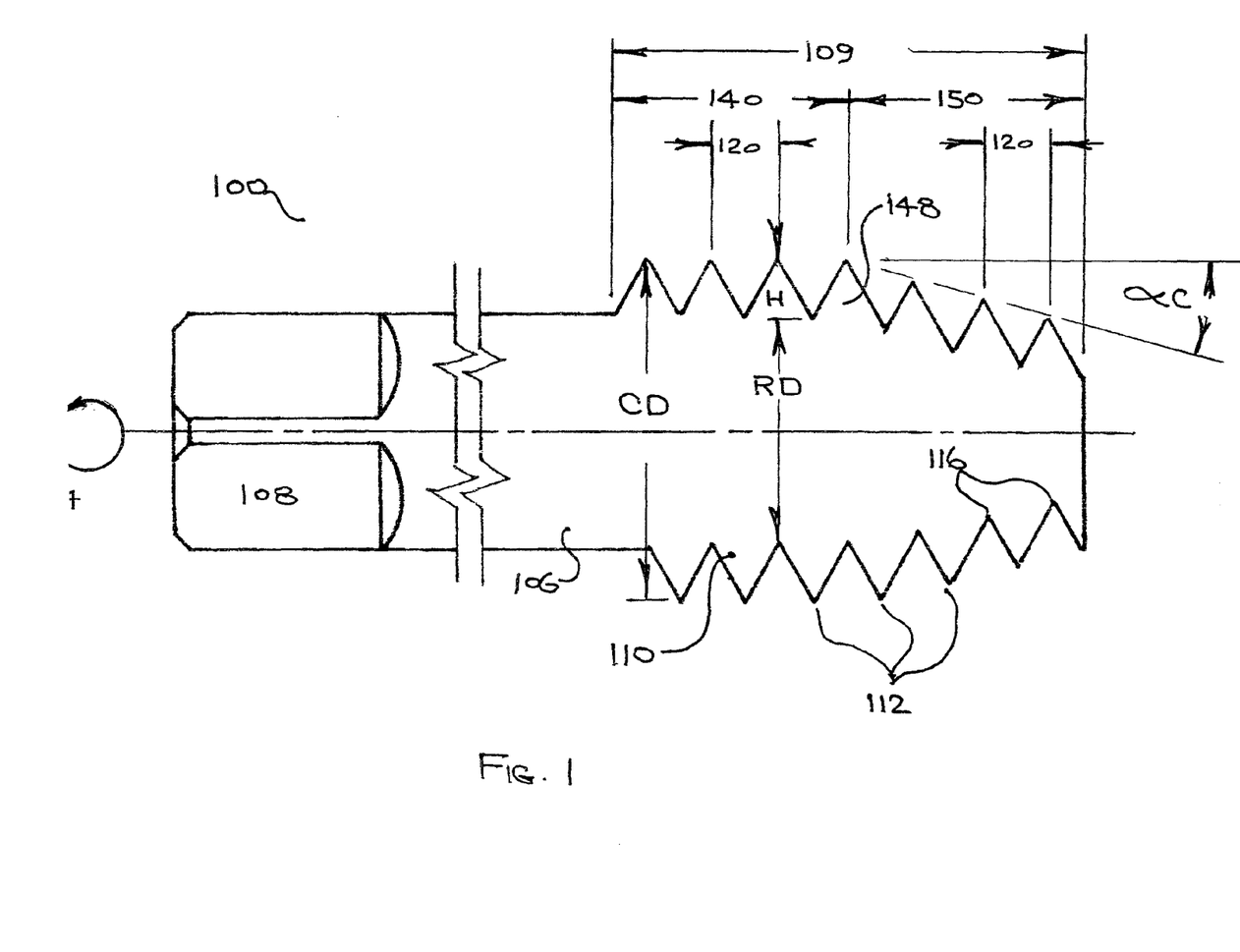
FIG. 1 is a section view of a form tap.
Figure 2:
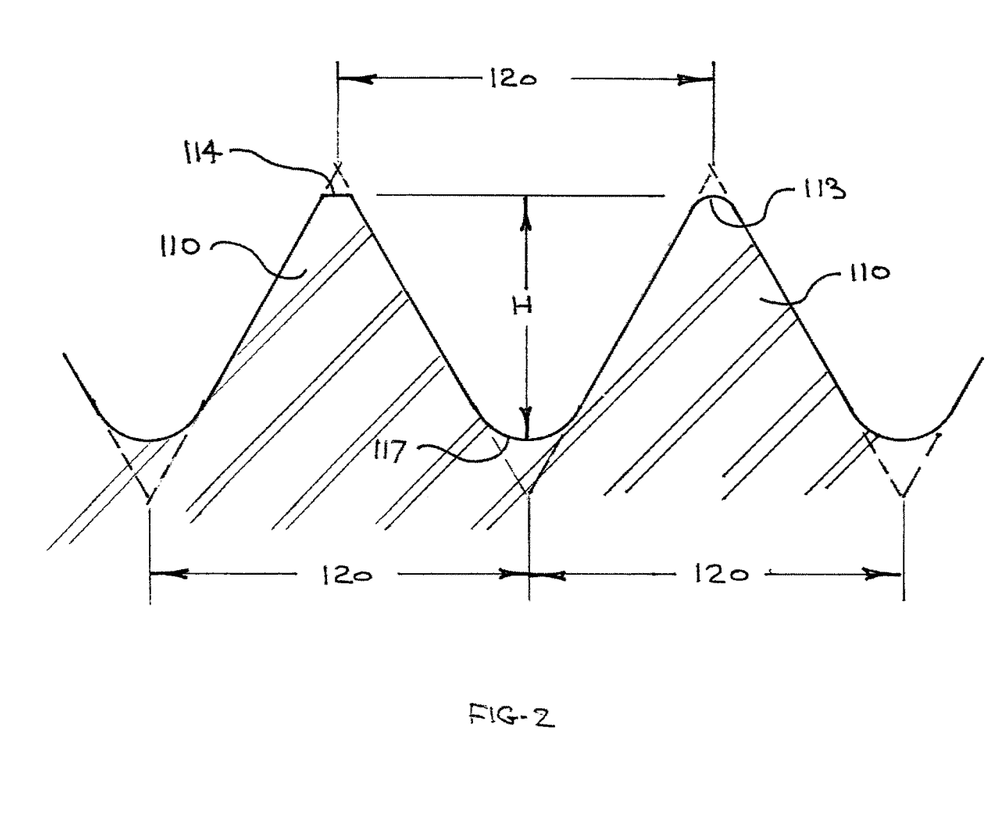
FIG. 2 is a partial section view of examples of threads for a form tap.

Reference is first made to FIGS. 1 and 2, which show an example of a form tap 100 having a shank 106 and a thread length or thread portion 109. The thread portion 109 includes a plurality of threads 110 and defines a finishing portion 140 and a chamfer portion 150 that are separated by a transition thread 148. For the purposes of this description, the form tap 100 is understood to include a plurality of threads 110, each thread 110 representing one revolution, or turn around the shank 106.

The term "thread" is also commonly used in the art to describe the single, continuous helical structure formed by the cooperation of each thread 110 as defined in this specification. In this context, each thread 110 may be understood as forming a portion or segment of the larger helical structure, but for the clarity, in this description the term "thread 110" is a single turn around the shank 106.

The term "threads" is also commonly used in the art to describe the features formed on the inner surface of a hole being tapped by the form tap 100. For clarity, in this description the term "formed threads" is used when referring to the "threads" created by the use of the form tap 100. In this description, the term "threads" is not limited to threads of a specific size, shape or configuration, but includes any thread forms and tap dimensions.

Each thread 110 of the form tap 100 has a crest 112 and a root 116. In this description a distance measured from a first crest to an adjacent crest or from a first root to an adjacent root is called a pitch 120. The pitch 120 may also be understood and described as a lead or thread spacing. The distance between opposing crests 112 on the form tap 100 is referred to as the crest diameter CD (or major diameter or outer diameter), and the distance between opposing roots 116 is referred to as the root diameter RD (or minor diameter or inner diameter). The difference between the crest diameter CD and the root diameter RD defines a thread height H.

As exemplified in FIG. 1, in some examples of a form tap 100 the chamfer portion 150 of the form tap 100 tapers at a chamfer angle $\alpha_c$ toward the tip (or end) of the form tap 100, to the right as shown in FIG. 1. Within the chamfer portion 150, the crest diameter CD and the root diameter RD both decrease as the chamfer portion 150 tapers, but the relative distance between the crest diameter CD and the root diameter RD (i.e. the thread height H) remains generally constant. At the tip of the form tap 100, shown at the right of FIG. 1, the crest diameter CD is smaller than the crest diameter CD of the finishing portion 140. In use, the tip of the chamfer portion 150 is inserted into the hole to be tapped, and the relatively smaller crest diameter CD may enable a user to easily insert and align the form tap 100 within the hole. The threads 110 of the chamfer portion 150 also serve to partially form the formed threads in the hole being tapped. As the form tap 100 is advanced into the hole being tapped, the threads 110 of finishing portion 140 complete, or finish, the formed threads that had been partially formed by the chamfer portion 150 by forming them into their final, usable or finished configuration. Optionally, the surface of the form tap 100 may comprise a plurality of lobes spaced around the surface of the form tap containing the threads 110, separated by lubrication grooves that do not contain threads. It is understood that the number, shape and configuration of the lobes formed on the form tap 100 may be selected based on the expected amount of heat and pressure exerted on the form tap during the form tapping process.

In existing form taps, it is common for the pitch or lead between adjacent thread crests to change, or be distorted, at the transition point (for example transition thread 148) between the finishing portion and the chamfer portion of the form tap. That is, in known form taps, the crest-to-crest distance between the transition thread and the first adjacent thread in the chamfer portion of the form tap is different than the desired pitch or lead. This change in the pitch or lead is generally referred to as lead error. In other words, in previously known form tap designs, the pitch (or lead or thread spacing), at the transition from finishing portion to chamfer portion is different than the pitch within the finishing portion and/or the chamfer portion. This type of lead error can result in increased form tap wear, increased torque requirements when using the form tap and irregular or improper formed threads in the article being tapped. Lead error may also increase the amount of heat and pressure exerted on the threads of a form tap during the form tapping process. Reducing or correcting the lead error may allow the lobes of a form tap to be larger which may extend the useful life of the form tap, as the heat and pressure acting on the form tap threads is reduced.

The effects of lead error described above are generally associated with a form tap having the lead error between the crests of its threads, as opposed to the roots of its threads. The effects of a lead error across the root-to-root distance of the transition thread (for example transition thread 148) may be less of a problem when the form tap is in use because the roots of the threads on the chamfer portion (for example chamfer portion 150) of a form tap do not engage or contact the formed threads in the hole being tapped. When a form tap is selected to tap a hole in an article, the characteristics of the form tap may be selected based on the desired final characteristics of the formed threads in the hole being tapped. For example, if the hole being tapped requires finished threads with a thread height of 2 mm, then the thread height H (i.e. the distance between the CD and the RD) along the finishing portion of the form tap may be set at 2.2 mm.

When the form tap is first inserted into the hole to be tapped, the crests of the chamfer portion may engage a portion of the hole wall because the crest diameter CD of the threads in the chamfer portion may be greater than the root diameter RD of the finishing portion. As the form tap is advanced into the hole, each thread in the chamfer portion may engage progressively more material in the hole wall, due to the increasing crest diameter along the length of chamfer portion. However, because the root diameter(s) RD along the chamfer portion are less than the root diameter RD of the finishing portion, the roots 116 of the threads 110 in the chamfer portion 150 do not contact the formed threads (i.e. the material of the hole wall) during the tapping process. Because the roots 116 do not contact the formed threads, the shape and configuration of the roots 116 of the chamfer portion 150 do not affect the formed threads in the article being tapped. Accordingly, errors in the spacing between the roots 116 of the chamfer portion 150 and the roots 116 of the finishing portion 140 may not create the lead error problems described above.

Therefore, it is understood that a form tap that is described as having "no lead error" or a "lead error correction" is a form tap having a constant crest-to-crest pitch (or lead), but that the form tap may have a lead error between the roots 116 of the chamfer section 150 and the roots 116 of the finishing portion 140. A lead error between roots 116 may not cause the lead error problems described above.

The form tap 100 described in this specification has no lead error between thread crests; i.e. the thread pitch 120 or lead of the form tap 100 remains constant along the entire thread portion 109. The form tap 100 is formed using a grinding tool that produces threads 110 that have a lead error correction or that are considered lead error free, as defined above. The crest-to-crest spacing between adjacent threads 110 of the form tap 100 remains constant along the length of the finishing portion 140, across the transition thread 148 and along the length of the chamfer portion 150. In this description, the term "constant" is understood to mean that the pitch 120 of the threads 110 remains essentially equal between adjoining threads for useful or practical purposes, subject to the manufacturing dimensional tolerances known in the art, and should not be strictly interpreted as meaning exactly identical.

Each thread 110 on the form tap 100 can be formed into a variety of known configurations based on the user's requirements. Examples of some possible thread 110 configurations are shown in FIG. 2. In one example, a thread 110 may be shaped so that the crest 112 comprises a crest flat 114, as shown on the left of FIG. 2. Or, as shown on the right of FIG. 2, a thread 110 may be shaped so that the crest 112 comprises a crest radius 113. In a preferred embodiment, the threads 110 are shaped so as to have a crest radius 113 as the crest radius 113 may help flow the material of the article being tapped, which may reduce the force required to tap the material and may prolong the useful life of the form tap 100. The shape of the crest 112 on the form tap 100 determines the shape of the major diameter created in the formed threads of the article being tapped.

It is understood that the specific details of the thread 110 features, for example the size of the crest flat 114 or crest radius 113, may be set by the form tap 110 manufacturer or they may be based on customer or user requirements. While the configuration of the thread 110 features may vary between form taps 100, the pitch 120 of the threads 110 on a given form tap 100 remains constant regardless of the thread configuration.

The form tap 100 also defines a first axis of rotation 104 that extends in the longitudinal direction of the form tap 100. In use, the form tap 100 is rotated about the first axis of rotation 104 to create the formed threads in an article that is being tapped. The form tap 100 may also be rotated about the first axis of rotation 104 during the form tap 100 manufacturing process described in detail below.

In most examples of the form tap 100, the shank 106 is generally round or cylindrical with flattened mounting portions (square driver) 108 to enable the form tap 100 to be securely mounted and gripped within a chuck, handle or other tool holding device. The shank 106 may contain any desired number of mounting portions 108 as needed to fit into a particular grinding machine (during manufacture) or a particular tool holder or handle (during use). Optionally, the shank 106 may be of a non-circular cross section, for example hexagonal, octagonal or any other suitable shape. In such a configuration, the shank 106 may not comprise discrete mounting portions 108 because the surfaces of the shank 106 itself may provide adequate mounting surfaces.

In the examples shown, the chamfer portion 150 has been shown having 3 threads 110, however; it is understood that the chamfer portion 150 may have a greater or fewer number of threads 110 (and optionally a longer or shorter length). In the figures, the size of the chamfer portion 150 relative to the finishing portion 140 may be exaggerated for clarity, but it is understood that the finishing portion 140 may be substantially larger than the chamfer portion 150 in some form taps 100. Also, it is understood that if the number of threads 110 in the chamfer portion 150 is changed, the chamfer angle $\alpha_c$ may also change.

While the form tap 100 is shown having continuous threads 110, it is understood that the threads 110 of the form tap 100 may be separated into a plurality of lobes. Also, portions of the form tap 100 may be treated using any known treatment process to produce desired mechanical properties. For example, the form tap 100 may be heat-treated, surface hardened, plated or coated with any desired coating such as chrome plating, TiN (Titanium nitride), TiCN (Titanium carbonitride) and layered TiAlN (Titanium aluminum nitride).

Figure 3:
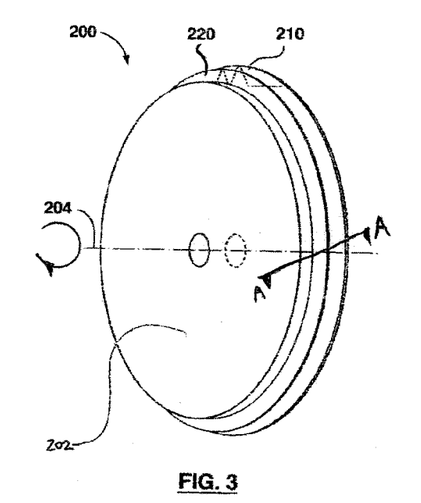
FIG. 3 is an isometric view of a grinding tool.

To create the form tap 100 having no lead error (i.e. a constant crest-to-crest pitch or lead along the entire thread portion 109) an operator may grind the form tap 100 using a unique grinding tool. FIG. 3 shows an example of a grinding tool that may be used to create the form tap 100 having no lead error, as described above. The grinding tool 200 can create form taps 100 having a lead error correction or a lead error adjustment that eliminates the lead error in the completed form tap, for all practical purposes, as described above. The grinding tool 200 is capable of creating constant crest-to-crest thread leads or pitches because its design ensures that any lead error introduced into the threads 110 is located on the roots 116 of the chamfer portion 150 which, as described in detail above, have no practical effects on the performance of a form tap or the shape of the formed threads.

FIG. 3 shows one example of a grinding tool that can produce a form tap having no lead error. As shown, grinding tool 200 (for example a grinding wheel 202) includes a first and second ribs 210 and 220 extending radially from its peripheral surface. The grinding tool 200 also defines a second axis of rotation 204. In use, the grinding tool 200 is mounted on a suitable thread grinding machine, such as thread grinding machines manufactured by Jones & Lamson, Matrix, Drake or Normac (not shown). The first and second ribs 210, 220 engage the form tap 100 to form the threads 110. Details relating to the configuration of the first rib 210 and second rib 220 are explained below with reference to FIGS. 4 and 5.

Figure 4:
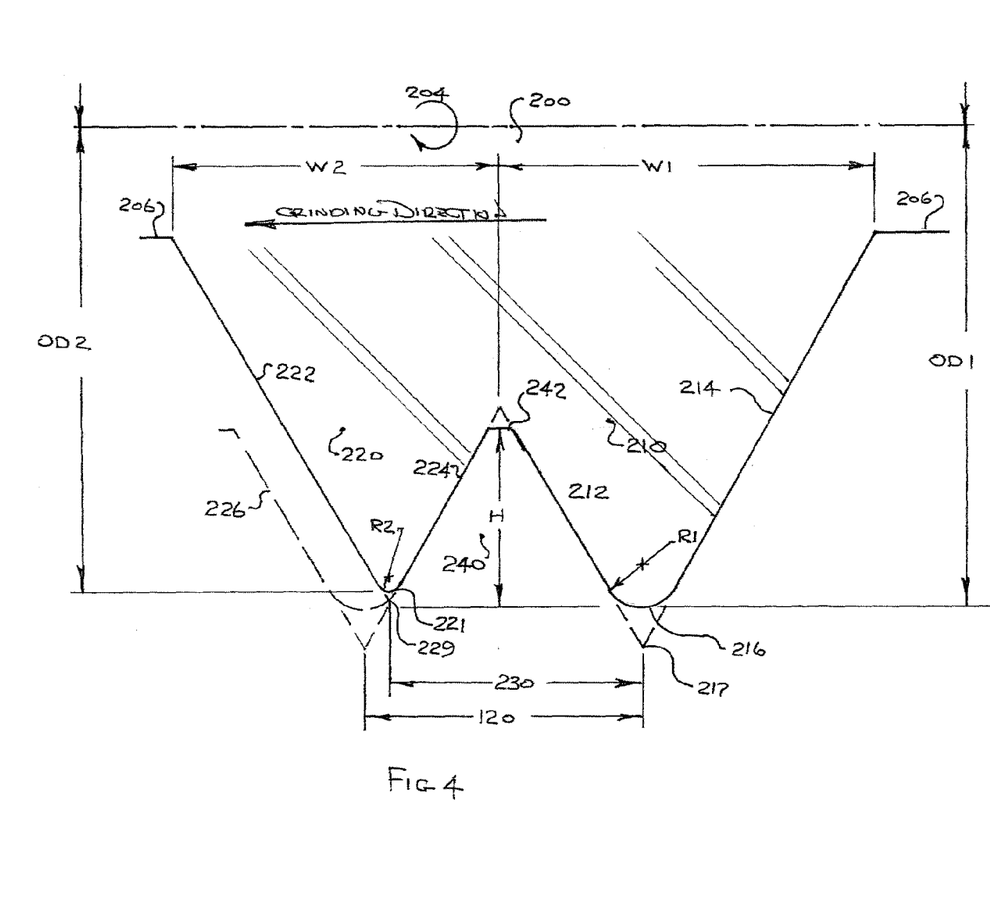
FIG. 4 is a partial section view of the grinding tool of FIG. 3.

FIG. 4 is a partial sectional view of the grinding tool 200 taken at section A-A showing the first rib 210 and the second rib 220 separated by a trough 240. As shown, the first rib 210 comprises a first rib leading face 212 and a first rib trailing face 214 that meet to define a first rib peak 216. The first rib 210 may also be described as the larger rib, the trailing rib or the finishing-grinding rib.

In some examples, the first rib leading face 212 and the first rib trailing face 214 may intersect to form a sharp edge at a theoretical first rib peak 217, illustrated using dashed lines in FIG. 4. However, the first rib 210 preferably comprises a peak 216 having a first peak radius $r_1$, instead of a sharp edge. Optionally, the first peak radius $r_1$ may be made as large as possible without creating an unsuitable shape of the root radius 117 (or threads 110 formed by the first rib 210) because increasing the first peak radius $r_1$ may decrease wear on the first rib 210 and extend the life of the grinding tool 200.

The first rib 210 also defines i) a first outer diameter OD1, which is the distance between the second axis of rotation 204 and the first rib peak 216, and ii) a minor or clearance diameter MD, which is the distance between the second axis of rotation 204 and the grinding tool shoulder 206. The difference between the first outer diameter OD1 and the minor diameter MD is at least equal to the thread height H doubled.

The grinding tool 200 also comprises a second rib 220. The second rib 220 may also be described as the smaller rib, the leading rib or the chamfer-grinding rib. The design, size and shape of the second rib 220 are related to, but are not equal to the dimensions of the first rib 210. To help illustrate this relation between the first and second ribs 210, 220 a phantom second rib 226 is shown using dashed lines in FIG. 4 The phantom second rib 226 represents a second rib that is identical to the first rib 210 and is spaced apart from the first rib 210 by a thread pitch 120. The phantom second rib 226 is only included for illustrative purposes and to help clarify the relation between the first rib 210 and the second rib 220.

As shown in FIG. 4, the second rib 220 defines a second rib leading face 222 and a second rib trailing face 224 that intersect to define a second rib peak 221. As described above in relation to the first rib peak 216, the second rib peak 221 may intersect to form a sharp edge 229 or it may comprise a second peak radius $r_2$, as shown in FIG. 4. The second rib leading face 222 is parallel to, but offset from the first rib leading face 212 while the second rib trailing face 224 coincides with the face of the phantom second rib 226 as shown.

The second rib 220 also defines a second outer diameter OD2, that is the distance between the second axis of rotation 204 and the second rib peak 221. As shown, the second outer diameter OD2 is less than the first outer diameter OD1. That is, the first rib 210 extends further from the grinding tool shoulder 206 than the second rib 220. Each rib 210, 220 also defines a rib width $W_1$, $W_2$ respectively. The first rib width $W_1$ is greater than the second rib width $W_2$.

Figure 5:
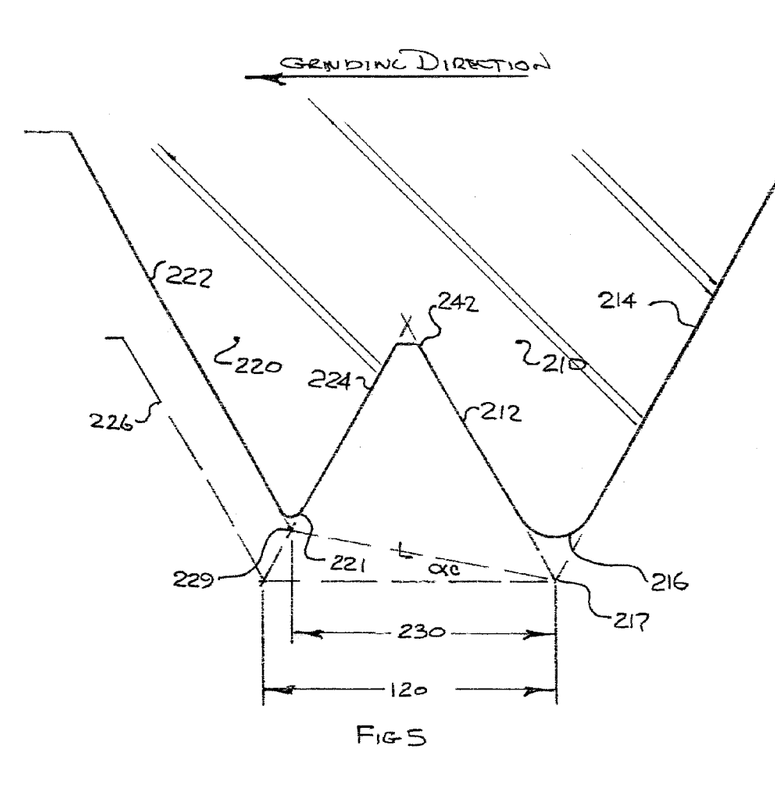
FIG. 5 is a schematic view of the partial section view of FIG. 4.

As exemplified in FIGS. 4 and 5 the second peak radius $r_2$ is smaller than the first peak radius $r_1$. Optionally, the second peak radius $r_2$ may be made as small as possible. In some examples, the second peak 221 may be initially formed as a sharp edge which then wears to form a second peak radius $r_2$ over time during use. Based on the performance of the grinding tool 200 and the required tolerances of the threads 110 formed using the grinding tool 200, there may be a range of second peak 221 profiles and second peak radius $r_2$ sizes that are acceptable. In such situations, a grinding tool 200 having a second peak radius $r_2$ that is as small as possible (or begins as a sharp edge) may allow that grinding tool 200 to be used for a longer period before the second peak radius $r_2$ exceeds a pre-determined maximum size and the grinding tool 200 has to be refurbished or dressed.

The trough 240 is defined by the depression or valley contained between the first and second ribs 210, 220. The trough 240 includes the leading edge 212 of the first rib 210, the trailing edge 224 of the second rib 220 and the tap OD grinding surface 242 at the bottom, or base of the trough 240. The height of the trough 240 relative to the first rib 210 (i.e. the distance between the grinding surface 242 and the first rib peak 217) is equal to the thread height H of the threads 110 on the finishing portion of the form tap 100. Accordingly, when the grinding tool 200 is in use, the grinding surface 242 is in contact with and shapes the crests 112 of the threads 110 of the finished form tap 100. As exemplified in FIGS. 4 and 5, the grinding surface 242 may be generally planar in order to form a crest flat 114 on each thread 110, but it is understood that in other examples of the grinding tool 200 the grinding surface 242 may comprise an arcuate shape having a radius to form a desired crest radius 113 on each thread 110 of the form tap 100. The distance between the second rib peak 221 and the grinding surface may be referred to as a second rib height and the distance between the first rib peak 216 and the grinding surface may be referred to as a first rib height.

The first and second ribs 210, 220 are separated by a peak spacing distance 230 that is measured from the centre of the first rib 210 to the centre of the second rib 220. The spacing between the first and second ribs 210, 220 is based on the desired thread pitch 120 of the threads 110 on the completed form tap 100 that is to be manufactured using the grinding tool 200. The peak spacing distance 230 is not equal to the thread pitch 120 or an even multiple thereof.

Optionally, the grinding tool 200 may be constructed so that the first rib 210 and second rib 220 are spaced to engage adjacent threads 110 on the form tap 100. In such a configuration the peak spacing distance 230 is less than the pitch 120.

FIG. 5 is a schematic representation of the sectional view of FIG. 4 showing the geometric relationship between the first rib 210 and the second rib 220 that determines the location of the second rib 220. For the purposes of calculating the geometric relationship between the first and second ribs 210, 220, measurements and calculations may be based on the locations of the theoretical first and second rib peaks 217, 229. The theoretical first and second rib peaks 217, 229 represent the location of the first and second ribs if both ribs were formed as sharp edges.

As shown in FIG. 5, the location of the second rib 220 relative to the first rib 210 is (for example the straight-line length L) is based on the desired pitch 120 and chamfer angle $\alpha_c$ of the form tap 100 calculated to give the required peak spacing distance to provide the lead error correction.

Because the configuration of the first and second ribs 210, 220 and the grinding surface 242 may be based on a desired combination of thread profile, pitch 120, root design length L and chamfer angle $\alpha_c$, a particular grinding tool 200 may be useful for creating a particular combination of these characteristics. For example, a grinding tool 200 configured to create a form tap having pitch 1.5 mm and a chamfer angle of 5 degrees may not be suitable for creating a form tap having a pitch 1.5 and a chamfer angle of 10 degrees. In some instances, a separate grinding tool 200 may be created for each desired form tap configuration/combination. However, in each example of the grinding tool 200 used, the resulting form tap 100 will have a constant crest-to-crest spacing as a result of the lead error correction/lead error adjustment described above.

The grinding tool 200 may be formed from a suitable material known in the art, including vitrified, ceramic and borazon. Also, the profile of the grinding tool 200 (i.e. the shape of the first and second ribs 210, 220) may be created using any known process including CNC dressing, roll dressing and crush forming. Preferably, the grinding tool 200 may be formed and shaped using a diamond dressing roll.

In the examples described, the grinding tool 200 has been shown as being a single tool, for example single grinding wheel having integrally formed first and second ribs, however; it is understood that the first and second ribs may not be integrally formed with the grinding tool 200. For example, the first and second ribs could be formed on a separate band, ring or collar that is connected around the periphery of a grinding wheel or other, non-consumable grinding tool body. Optionally, the first and second ribs may be formed on separate bands or rings, each of which is secured around the perimeter or periphery of the grinding tool 200. In yet another example, the grinding tool may comprise two separate grinding wheels spaced apart at an appropriate axial distance from each other along the second axis of rotation; each wheel comprising one of the ribs.

To manufacture the form tap 100 having no lead error (i.e. having a constant crest-to-crest spacing) using the grinding tool 200 as described above, an operator may install the grinding tool 200 on a grinding machine (not shown) so that it rotates about its second axis of rotation 204. A form tap blank (which will be formed into form tap 100) is then positioned in the thread-grinding machine. It is understood that the blank is loaded and secured in the machine in a known manner so that the blank rotates about the first axis of rotation 104. The first axis of rotation 104 is parallel to, and offset from the second axis of rotation 204. Once both the blank and grinding tool 200 have been mounted in the thread-grinding machine they are rotated about their respective axes of rotation.

Figure 6:
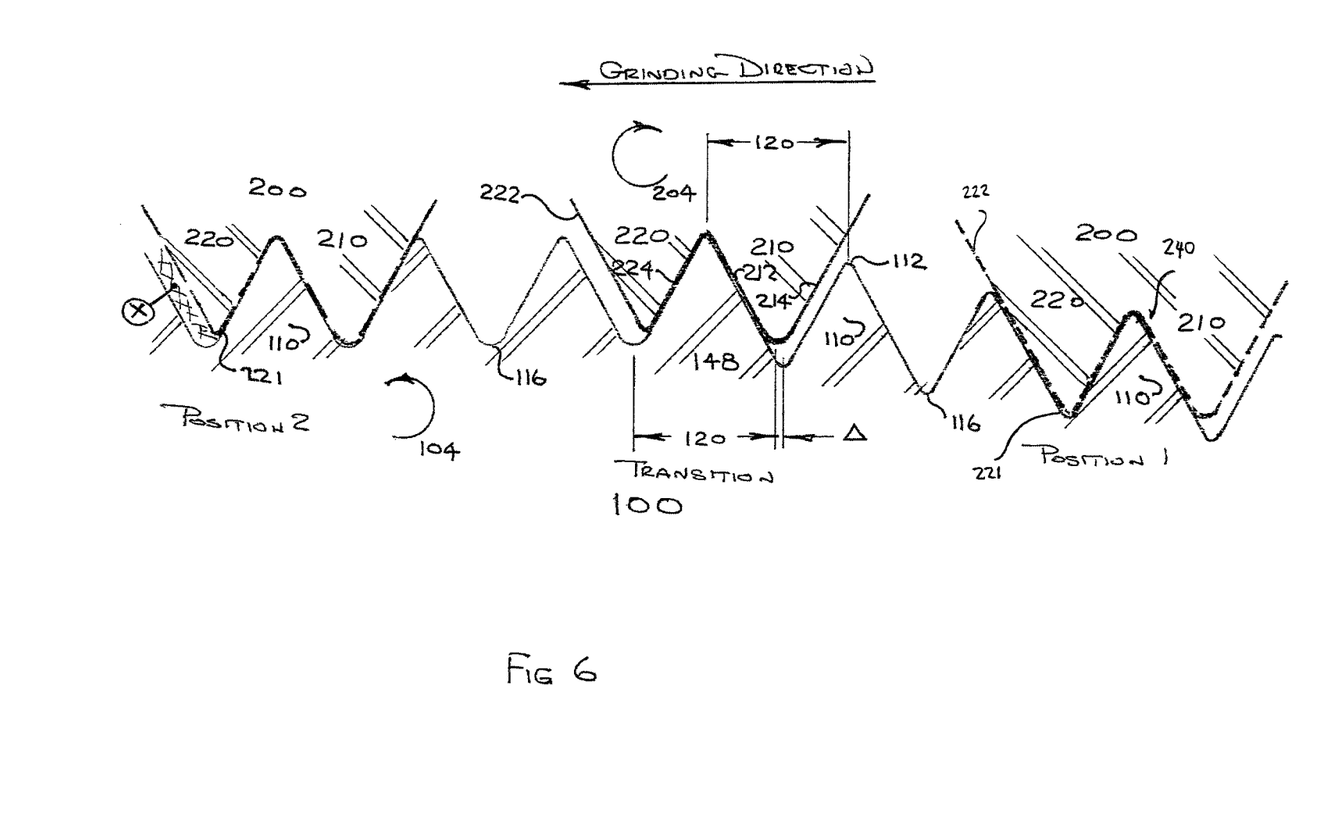
FIG. 6 is a schematic representation of a grinding tool forming threads on the chamfer, the transition thread, and the straight thread portions of a form tap.

With both the blank and the grinding tool 200 rotating, the second axis of rotation 204 is moved toward the first axis of rotation 104 so that the ribs 210, 220 of the grinding tool 200 engage (or interfere with) the surface of the blank of the form tap 100. FIG. 6 is a partial section representation of the grinding tool 200 ribs 210, 220 engaging the form tap 100. As both the form tap 100 and grinding tool 200 are rotated about their respective axes of rotation, the grinding tool 200 is advanced along the length of the form tap 100 (from the chamfer portion 150 to the finishing portion 140) at an axial feed rate, in generally the machine direction as shown in FIGS. 4-6.

In this application, the terms "machine direction" and "grinding direction" describe the relative motion between the grinding tool 200 and the form tap 100. It is understood that the necessary relative motion may be achieved by holding the form tap 100 in place and moving the grinding tool 200 from right to left as shown in FIG. 6, by holding the grinding tool 200 in place and moving the form tap 100 from left to right as shown in FIG. 6, or by a combination thereof. It is also understood that the machine direction is intended to describe the general direction of movement between the grinding tool 200 and the form tap 100 and that when the grinding tool 200 is forming the chamfer portion 150 of the form tap 100 the grinding tool 200 may move at an angle relative to the first axis of rotation 104. Preferably, the angle is the chamfer angle of the form tap being manufactured.

As exemplified in FIG. 6, when the grinding tool 200 is used to create a form tap 100, the different portions of the grinding tool 200, i.e. the first and second ribs 210, 220 and the trough 240 may perform different grinding or forming functions. Specifically, the second rib 220 and trough 240 perform a majority of the shaping and grinding on the chamfer portion 150 of the form tap 100, (shown as position 1) whereas the trough 240 and the first rib 210 cooperate to shape the threads 110 on the finishing portion 140 of the form tap 100 (shown as position 2). The operation of the grinding tool 200 in use is explained in further detail below.

When grinding tool 200 is used to form the chamfer portion 150 (position 1) of the form tap 100, the initial grinding of each thread 110 in the chamfer portion 150 is performed by the leading face 222, the second rib 220 and the second rib peak 221. For example, when the grinding tool 200 first contacts the form tap 100, the leading face 222 of the second rib 220 grinds and forms a corresponding face on a first thread 110 and the second rib peak 221 grinds the root 116 of the first thread 110. As the grinding tool 200 is advanced along the length of the form tap 100 (from right to left in FIG. 6 as shown using different line types to represent different positions of the grinding tool 200), the leading face 222 of the second rib 220 engages the next, adjacent thread (i.e. a second thread) on the chamfer portion 150 and simultaneously the trough 240 will engage and shape both faces and the crest and first thread. As shown, when the trough 240 is positioned about a thread 110, the second rib trailing face 224, the grinding surface 242 and the first rib leading face 212 cooperate to grind both faces and the crest 112 of the thread. When the trough 240 is engaged with a given thread, the leading edge 212 and second rib peak 221 of the second rib 220 may engage the next, adjacent thread.

To form the chamfer portion 150, the grinding tool 200 is advance along the length of the chamfer portion 150 at an angle relative to the first axis of rotation 104, preferably the chamfer angle. As a result of this angular displacement away from the first axis of rotation 104, as the grinding tool 200 advances the first rib peak 216 does not contact the roots 116 of the threads 110 in the chamfer portion 150 that were formed by the second rib 220. Therefore, as shown in FIG. 6 the roots 116 of the threads 110 in the chamfer portion 150 of the form tap 100 are shaped by the second rib peak 221 and have a root radius that is substantially equal to the second peak radius $r_2$. As described above, the shape of the roots 116 in the chamfer portion 150 is not critical because the chamfer roots 116 do not form part of the functional or useful portion of the form tap 100 (i.e. the thread crests 112 and the roots 116 of the finishing portion 140). The shapes of these roots 116 are not adjusted or modified by the first rib 210.

When the grinding tool 200 reaches the transition thread 148 the motion of the grinding tool 200 relative to the form tap 100 changes such that distance between the first axis of rotation 104 and the second axis of rotation 204 remains constant whereby the grinding tool 200 moves along the form tap 100 but does not move further away from the first axis of rotation 104. As a result of this change in relative movement, when the grinding tool moves along the finishing portion 140 of the form tap, the first rib 210 will follow the same path as the second rib 220. This may be advantageous because it enables the first rib 210 to complete threads 110 along the finishing portion 140 that have been partially formed by the second rib 220.

Specifically, as has been described above in detail, the first rib 210 is shaped to correspond to the desired finished thread 110 profile and the second rib 220 is narrower and shorter than the first rib 210 and has a second peak radius 221 that is smaller than the desired root radius of the finished form tap thread 110. Therefore when the second rib 220 grinds a thread 110 on the finished portion 140 an amount of residual material "X" (shown as the hatched region on the left side of FIG. 6) is left behind between the leading face 222 of the second rib 220 and the desired finished thread shape, shown in dashed lines.

During a subsequent revolution, as the grinding tool 200 is advanced along the flat, finishing portion 140, the first rib 210 will correct the finished thread shape by removing the residual material "X" and correcting the root radius using the leading face of the first rib 212 and the first rib peak 216 respectively. A schematic illustration of the position of the grinding tool's 200 movement from a first position (Short dashed lines) to a second position (long dashed lines) is shown in FIG. 6.

The grinding tool 200 is also shown in a third position or transition position (solid lines) in which the trough 240 is shaping the transition thread 148 and the leading face 222 of the second rib 220 would be partially forming the adjacent thread 110*a*. When the grinding tool 200 advances toward the second position (shown in long dashed lines) the leading face of the first rib 210 corrects and completes the shape of thread 110*a* by removing the residual material and shaping root 116*a*.

As shown, throughout the grinding process the crests 112 are shaped by the grinding surface of the trough 240. As the grinding tool 200 moves along the form tap 100, the trough is always "in lead" or on pitch which allows the crests 112 along the entire length of the form tap 100 to be free from lead error. In contrast, when the grinding tool 200 transitions from the chamfer portion 150, in which all the roots 116 are shaped by the second rib peak 221, to the finishing portion 140, in which the roots 116 are corrected by the first rib peak 216, a lead error A is created between the roots of the chamfer portion 150 and the roots of the finishing portion 140 due to the spacing between the first and second ribs 210, 220. However, as described above, because the roots of the chamfer portion do not form part of the functional portion the lead error A may not affect the performance of the finished form tap 100. This preservation of the crest-to-crest spacing at the expense of the root-to-root spacing enables the form tap 100 to have no lead error (as defined above) and may be an advantage of the grinding tool 200.

In the example shown (in FIG. 1), the form tap 100 includes three (3) threads 110 in the chamfer portion 150; however, it is understood that the chamfer portion 150 of a form tap may include a greater or fewer number of threads 110 in the chamfer portion 150, based on the user requirements, including pitch, thread height, and desired chamfer portion length.

In some examples, it may be possible for both the finishing portion 140 and the chamfer portion 150 of the form tap 100 to be formed using the grinding tool 200 in a single-pass process. That is, a blank is shaped into a form tap 100 by forming the threads 110 of both the finishing portion 140 and the chamfer portion 150 in a single, continuous operation by advancing the grinding tool 200 along the length of the blank, from the chamfer portion 150 to the finishing portion 140.

In other examples, the grinding tool 200 may be used to form the threads of a form tap in a multi-stage or multi-pass process. In such an example, during each successive pass the grinding tool 200 may remove progressively more material from the form tap blank. During each pass the grinding tool 200 may be moved along the entire length of a form tap blank, from chamfer portion 150 to finishing portion 140, to rough-in (or partially form) the threads of the form tap 100. Then, once the first pass has been completed, the grinding tool 200 may be repositioned closer to the first axis of rotation 104 of the form tap (generally in advance of the transition thread) and advanced along the length of the form tap for a second, rough-in pass. During the second pass, the ribs of the grinding tool may follow and further shape the partially-formed threads from the first rough-in pass. Generally, the final pass of a multi-pass process is referred to as the finishing pass in which the threads 110 are formed into their final shape. An advantage of the present grinding tool 200 may be that the same grinding tool 200 may be used throughout a continuous, multi-pass process to form both the chamfer portion 150 and the finishing portion 140 of a form tap 100 without requiring a tool change or adjustment.

Preferably, the multi-pass process includes four passes, comprising three rough-in passes and one finishing pass.

The multi-pass process may be advantageous because it may i) reduce the wear on the grinding tool, and ii) reduce the heat generated during the thread forming process thereby reducing the cooling and lubrication requirements of the manufacturing process.

The present invention has been described here by way of example only. Various modification and variations may be made to these exemplary embodiments without departing from the spirit and scope of the invention, which is limited only by the appended claims.

I claim:

1. A grinding apparatus for forming threads on a chamfer portion and a finishing portion of a tap, the grinding wheel comprising:
   a. a body portion rotatable about a rotation axis and having a peripheral surface;
   b. a first rib extending around the periphery of the body portion and projecting radially outwardly from the peripheral surface between a first base portion and a first peak spaced radially outwardly from the first base portion, the first rib having a first leading side surface and a first trailing side surface, the first leading side surface and the first trailing side surface being inclined and extending between the first base portion and the first peak and converging toward the first peak, the first peak being radially spaced apart from the wheel axis by a first peak distance and the first base portion having a first width measured in the axial direction;
   c. a second rib axially offset from the first rib, extending around the periphery of the body portion and projecting radially outwardly from the peripheral surface between a second base portion and a second peak spaced radially outwardly from the second base portion, the second rib having a second leading side surface and a second trailing side surface, the second leading side surface and the second trailing side surface being inclined and extending between the second base portion and the second peak and converging toward the second peak, the second leading side being parallel to the first leading side surface and the second trailing surface being parallel to the first trailing side surface, the second peak being radially spaced apart from the wheel axis by a second peak distance that is less than the first peak distance, and the second base portion having a second width measured in the axial direction that is less than the first width; and d. a crest forming surface extending between the first side surface of the first rib and the second side surface of the second rib, the crest forming surface offset radially inwardly from the first crest by a radial distance that is substantially equal to a thread height of threads on a finishing portion of the tap and being configured to shape crests of threads on both a chamfer portion and the finishing portion of the tap.

2. The apparatus of claim 1, wherein the first side surface of the first rib, the crest forming surface and the second side surface of the second rib are positioned so that when the crest forming surface shapes the crest on one thread on the tap the one thread is simultaneously contacted by the first side surface on the first rib and the second side surface on the second rib.

3. The apparatus of claim 2, wherein the one thread on the tap is a transition thread intermediate the chamfer portion and the finishing portion of the tap.

4. The apparatus of claim 1, wherein in a section taken in a first plane containing the rotation axis, the intersection of a second plane containing the first side of the first rib and a third plane containing the second side of the first rib defines a first theoretical peak and the intersection of a fourth plane containing the first side of the second rib and a fifth plane containing the second side of the second rib defines a second theoretical peak and a line extending between the first and second theoretical rib peaks intersects the rotation axis at a chamfer angle of the tap.

5. The apparatus of claim 1, wherein the first peak is configured to shape roots of the threads on the finishing portion of the tap and defines a first peak radius, and the second peak defines a second peak radius that is smaller than the first peak radius.

6. The apparatus of claim 5, wherein the second peak is configured to shape roots of threads on the chamfer portion of the tap.

7. The apparatus of claim 1, wherein portions of the grinding apparatus that are configured to contact the form tap are limited to the first rib leading surface, the first rib trailing surface, the crest forming surface, the second rib leading surface and the second rib trailing surface.

8. The apparatus of claim 1, wherein the grinding apparatus defines a grinding direction and the second rib and the crest grinding surface are positioned ahead of the first rib in the grinding direction.

9. The apparatus of claim 1, wherein the second peak is axially spaced apart from the first peak by a rib spacing distance that is between n and n+1 thread pitches of the threads on the tap, wherein n is integer greater than or equal to zero.

10. The apparatus of claim 1, wherein rib spacing distance is less than one thread pitch of the tap.

11. A grinding apparatus for forming threads on a chamfer portion and a finishing portion of a tap, the chamfer portion of the tap defining a chamfer angle, the grinding wheel comprising:

a. a body portion rotatable about a rotation axis and having a peripheral surface;

b. a first rib extending around the periphery of the body portion and projecting radially outwardly from the peripheral surface between a first base portion and a first peak spaced radially outwardly from the first base portion, the first rib having first and second inclined side surfaces extending between the first base portion and the first peak and converging toward the first peak, the first peak being radially spaced apart from the wheel axis by a first peak distance and the first base portion having a first width measured in the axial direction, the first rib configured so that in a section taken in a first plane containing the rotation axis, the intersection of a second plane containing the first side of the first rib and a third plane containing the second side of the first rib defines a first theoretical peak;

c. a second rib axially offset from the first rib, extending around the periphery of the body portion and projecting radially outwardly from the peripheral surface between a second base portion and a second peak spaced radially outwardly from the second base portion, the second rib having first and second inclined side surfaces extending between the second base portion and the second peak and converging toward the second peak, the first inclined side on the second rib being generally parallel to the first inclined side surface on the first rib, the second peak being radially spaced apart from the wheel axis by a second peak distance that is less than the first peak distance, and the second base portion having a second width measured in the axial direction that is less than the first width, the second rib configured so that in the section taken in the first plane containing the rotation axis the intersection of a fourth plane containing the first side of the second rib and a fifth plane containing the second side of the second rib defines a second theoretical peak and a line extending between the first and second theoretical rib peaks intersects the rotation axis at a chamfer angle of the tap; and d. a crest forming surface extending between the first side surface of the first rib and the second side surface of the second rib.

12. The apparatus of claim 11, wherein the crest forming surface is offset radially inwardly from the first crest by a radial distance that is substantially equal to a thread height of threads on a finishing portion of the tap and being configured to shape crests of threads on both a chamfer portion and the finishing portion of the tap.

13. The apparatus of claim 11, wherein the first side surface of the first rib, the crest forming surface and the second side surface of the second rib are positioned so that when the crest forming surface shapes the crest on one thread on the tap the one thread is simultaneously contacted by the first side surface on the first rib and the second side surface on the second rib.

14. A grinding apparatus for forming threads on a chamfer portion and a finishing portion of a tap, the grinding wheel comprising:

a. a body portion rotatable about a rotation axis and having a peripheral surface;

b. a first rib extending around the periphery of the body portion and projecting radially outwardly from the peripheral surface between a first base portion and a first peak spaced radially outwardly from the first base portion, the first rib having a first leading face and a first trailing face, the first leading face and the first trailing face being inclined and extending between the first base portion and the first peak and converging toward the first peak, the first peak being radially spaced apart from the wheel axis by a first peak distance and the first base portion having a first width measured in the axial direction;

c. a second rib axially offset from the first rib, extending around the periphery of the body portion and projecting radially outwardly from the peripheral surface between a second base portion and a second peak spaced radially outwardly from the second base portion, the second rib having a second leading face and a second trailing face, the second leading face and the second trailing face being inclined and extending between the second base portion and the second peak and converging toward the second peak, the second leading face being parallel to the first leading face and the second trailing face being parallel to the first trailing face, the second peak being radially spaced apart from the wheel axis by a second peak distance that is less than the first peak distance, and the second base portion having a second width measured in the axial direction that is less than the first width;

d. a crest forming surface extending between the first side surface of the first rib and the second side surface of the second rib;

wherein the first side surface of the first rib, the crest forming surface and the second side surface of the second rib are positioned so that when the crest forming surface shapes the crest on one thread on the tap the one thread is simultaneously contacted by the first side surface on the first rib and the second side surface on the second rib.

15. The apparatus of claim 14, wherein the crest forming surface is offset radially inwardly from the first crest by a radial distance that is substantially equal to a thread height of threads on a finishing portion of the tap and being configured to shape crests of threads on both a chamfer portion and the finishing portion of the tap.

16. The apparatus of claim 14, wherein the first side surface of the first rib, the crest forming surface and the second side surface of the second rib are positioned so that when the crest forming surface shapes the crest on one thread on the tap the one thread is simultaneously contacted by the first side surface on the first rib and the second side surface on the second rib.

* * * * *